Feb. 21, 1967  T. Y. CRAM  3,305,146
ADJUSTABLE DRESS FORM
Filed April 12, 1965  3 Sheets-Sheet 1

INVENTOR.
TERI YORK CRAM
By White & Haefliger
ATTORNEYS.

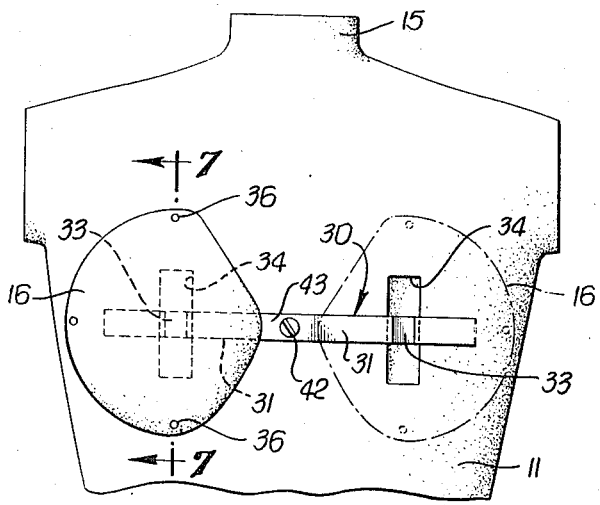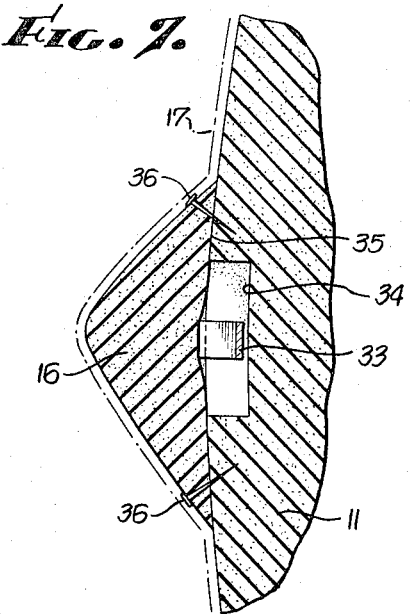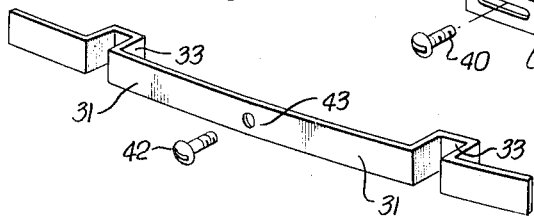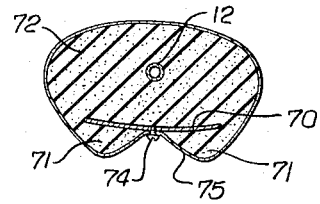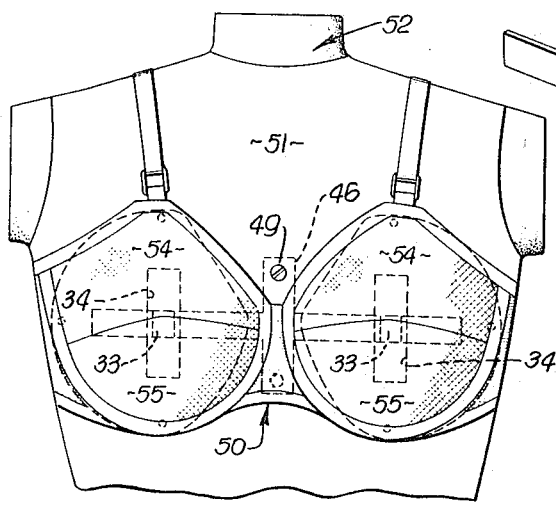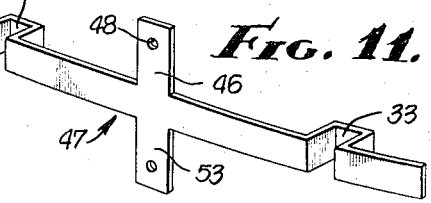

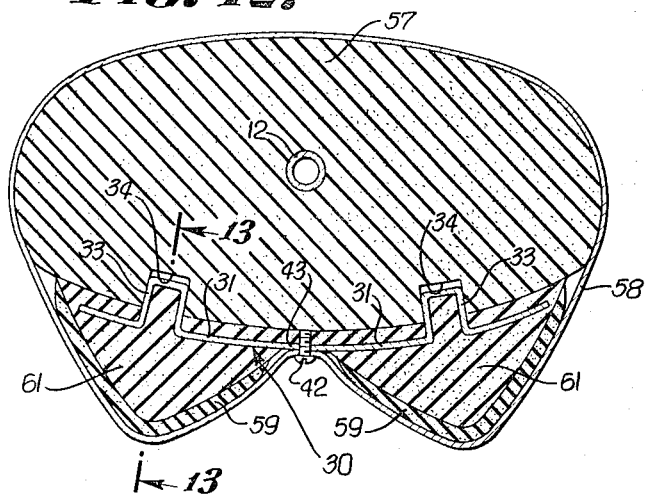
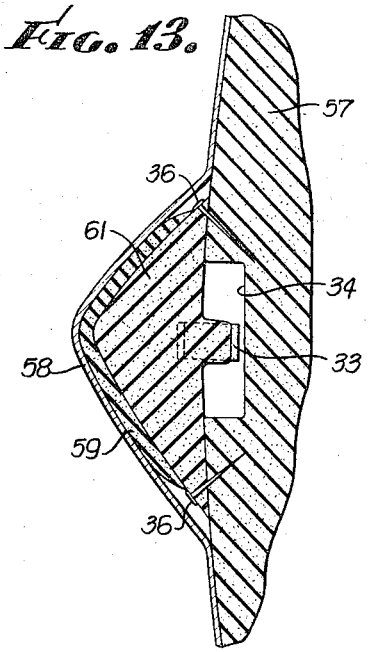
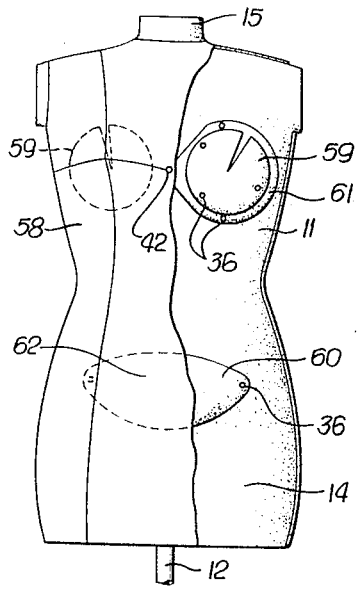
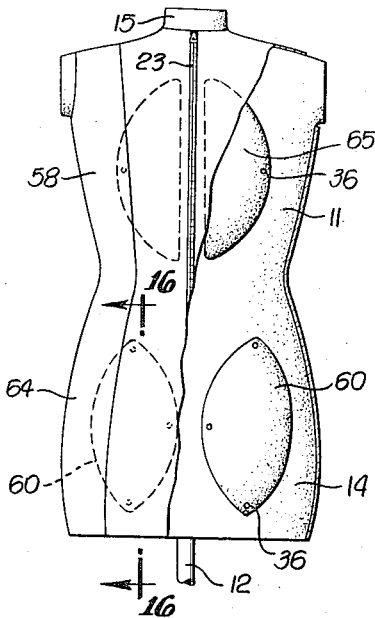
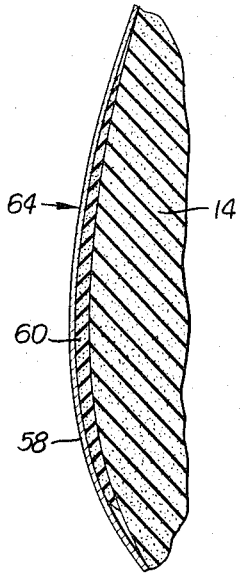
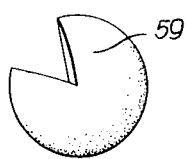
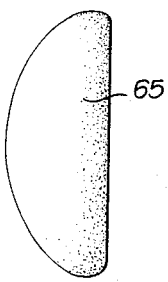
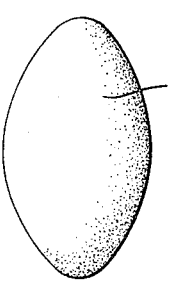

United States Patent Office 3,305,146
Patented Feb. 21, 1967

3,305,146
ADJUSTABLE DRESS FORM
Teri York Cram, 11551 Dona Evita Drive,
Studio City, Calif. 91604
Filed Apr. 12, 1965, Ser. No. 447,449
12 Claims. (Cl. 223—68)

This invention relates generally to dress forms, and more particularly concerns improvements to forms of the type wherein a substantially non-stretchable jacket fits over a resilient plastic body in compressing relation thereto.

While many different dress forms have been constructed in the past, none of them possess the unusually effective combinations and sub-combinations of advantages characterizing the present form. Among such advantages are the provision of form busts supported for adjustable displacement relative to the main extent of the form body, and of support means retained at the front of the form body to extend beneath the busts and to retain the jacket portion in form fitting relation to and between the busts while allowing adjustable displacement of the latter. More specifically, the support means typically extends transversly at the front of the resilient body, and a retainer is carried by the intermediate extent of the support means to urge the jacket portion between the adjustable busts in an inward direction for better fitting to the body.

Other objects and advantages include the provision of a jacket support means extending transversely at the front of the body in such manner as to be both horizontally and vertically adjustable; the provision of a support means at the front of the body to retain the form jacket inwardly between the busts while accommodating the fitting of a brassiere to the form; the provision for increasing the size of the dress form through the use of padding inserted under the form jacket and against the compressible and resilient form body; and the provision of a form standard of unusualy advantageous construction.

These and other objects and advantages of the invention, as well as the details of illustrative embodiments, will be more fully understood from the following detailed description of the drawings in which:

FIG. 6 is an enlarged elevation of the dress form body bust;

FIG. 7 is an enlarged vertical section taken on line 7—7 of FIG. 6;

FIG. 8 is a perspective showing of a jacket support means as usable in the FIGS. 1-7 form;

FIG. 9 is a perspective showing of a modified jacket support means;

FIG. 10 is a front elevation of dress form incorporating the invention and into which a brassiere has been fitted;

FIG. 11 is a perspective showing of a jacket support means as usable in the FIG. 10 dress form;

FIG. 12 is a view like FIG. 4 but showing the use of pads for increasing the dress form bust size;

FIG. 13 is a vertical section taken on line 13—13 of FIG. 12;

FIG. 14 is a front elevation of a form incorporating the invention and including body size increasing pads as also used in FIG. 12;

FIG. 15 is a rear view of the FIG. 14 form and including other size increasing pads;

FIG. 16 is an enlarged section taken on line 16—16 of FIG. 16;

FIGS. 17-19 show the pads as used in FIGS. 14 and 15; and

FIG. 20 is a view like FIG. 4, but showing a further modified dress form.

Figure 1:
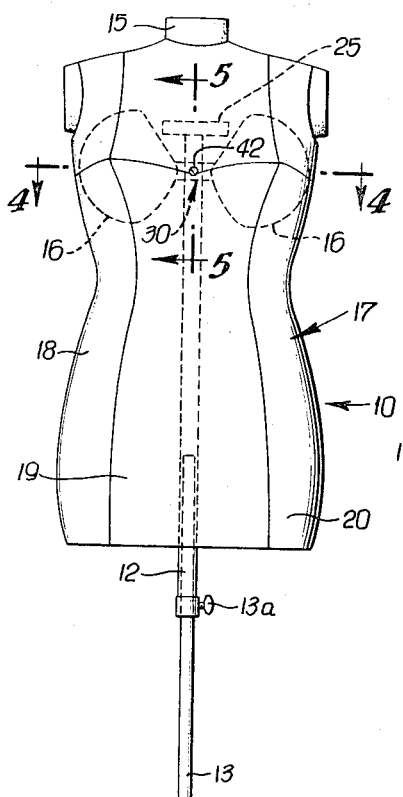
FIG. 1 is a front elevation showing one preferred form of a dress form incorporating the invention.

In FIGS. 1-7, the dress form 10 is illustrated to include a resiliently compressible plastic body having the form of a human female torso between the thigh and neck region. One such body is indicated at 11, and it may comprise a molded foam material such as foam rubber or an expanded polyurethane plastic product or an equivalent thereof. The body is carried on a standard that includes telescopically interfitting upper and lower vertical tubes 12 and 13 which may be interconnected by a suitable set screw 13a at any desired height of the form 10. The upper tube 12 may be molded into the body 11, and it may receive the lower tube 13, as shown. Also the upper tube may carry a T-head 25 providing additional support for the molded body 11.

Body 11 includes hip and neck regions 14 and 15, and busts 16 supported for adjustable displacement relative to the main front extent of the body. Typically, the busts are made of the same or similar compressible material as the body, and they are shiftable up and down relative to the body for adjustment to closely duplicate a selected figure, the busts being separate from the body 11.

The busts 16 are compressed or held inwardly toward the body extent inwardly of the busts, and the resilient body itself is adjustably compressed, by a jacket 17 of non-stretchable material, as for example a light weight canvas. The jacket may be constructed of several vertically extending panels 18-22 of material connected or otherwise sewn together to result in a shape conforming to the selected human female contour when the jacket is fitted over the body 11. Such fitting may be accommodated as by a jacket zipper 23 running vertically at the rear and connecting rear panels 21 and 22. Also, the zipper may be located at a seam provided in the front panel. It is also possible to use other jacket constructions such as a skirt and upper torso portions or panels with a horizontal seam at waistline and/or midriff.

Of particularly effective advantage is the provision of support means retained at the front of the body to extend beneath the busts and to retain the jacket portion 26 between the busts; further, the support means typically allows adjustable displacement of the busts relative to the main extent of the body. One such support means is seen in FIGS. 4-8 to comprise a transversely elongated member 30 of metal or other solid material having transversely spaced extents 31 retained by and concealed beneath the busts. Extents 31 typically have tongue and groove connections with the busts and the main extent of the body 11, as for example is afforded by the vertically elongated tongues 32 integral with the busts and received in the metal channels 33 of member 30. The channels 33 in turn fit in vertically elongated grooves 34 sunk in the front of body 11. This construction allows vertical adjustment of the member 30 as well as independent vertical adjustment of the busts, all in relation to the main body. FIG. 7 additionally show the frictional interface engagement at 35 of the busts with the body 11, to help hold the busts in selected position, and pins 36 may also be used for this purpose, the pins being inserted before the jacket 17 is fitted on the body.

FIG. 9 shows an alternate support means as comprising transversely elongated metallic members 38 and 39 having adjustable interconnection, as by means of fastener 40, to allow transverse elongation of the members. Each member also has a channel 41 to allow tongue and groove connection with a bust and the main body 11, as previously described in reference to FIG. 4. Accordingly, the busts may also be transversely adjusted to limited extent, the main body foam material at opposite sides of the channel receiving grooves being sufficiently compressible to allow such adjustment.

Figure 5:
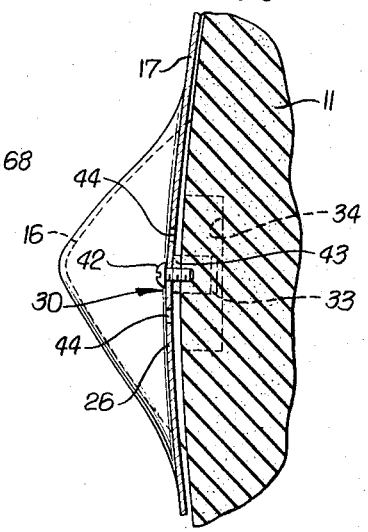
FIG. 5 is an enlarged vertical section taken on line 5—5 of FIG. 1.

Referring back to FIG. 4, it will be seen that a retainer, that may include a headed screw fastener 42, is carried by the intermediate extent 43 of the support member 30, and that it functions to urge the jacket portion 26 between the busts in an inward direction, thereby to better fit the busts. Fastener 40 in the FIG. 9 support serves the same function. Referring to FIGS. 10 and 11, the retainer may also include a tongue or strip of metal 46 integral with the modified support member 47 and extending generally vertically for connection with the fastener 49 via a threaded fastener opening 48 at a location in transverse alignment with the upper bust regions 54. This arrangement locates the fastener 49 above and in noninterfering relation to a brassiere 50 fitted over the jacket 51 on the compressible body 52. The brassiere over the jacket 51 provides an ensemble best suited for accurate dress fitting during dressmaking. The retainer may also include a similar but downwardly extending tongue 53 for connection to a suitable fastener also acting to urge the jacket inwardly at a location in transverse alignment with the underbust regions 55. FIG. 5 shows jacket 17 as having several vertically spaced openings 44 to receive the fastener.

FIGS. 12–19 illustrate various ways in which resiliently compressible, as for example foam rubber padding may be selectively placed between the compressible body 57 and jacket 58 of a dress form. FIGS. 12, 13, 14 and 17 show how padding in the form of a generally conical wrapper 59 may be fitted about a bust 61 to provide enlargement. FIGS. 14, 15 and 16 show padding in the form of flat sheets 60 placed and compressed between the body and jacket at the abdomen location 62, and also placed and compressed between the body and jacket at the hip locations 64. Padding at the small of the back and between the jacket and body is indicated at 65.

Figure 2:
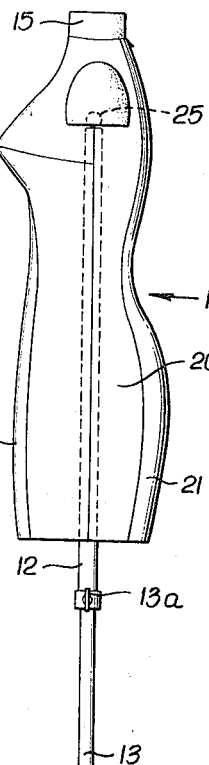
FIG. 2 is a side elevation of the FIG. 1 form.
Figure 3:
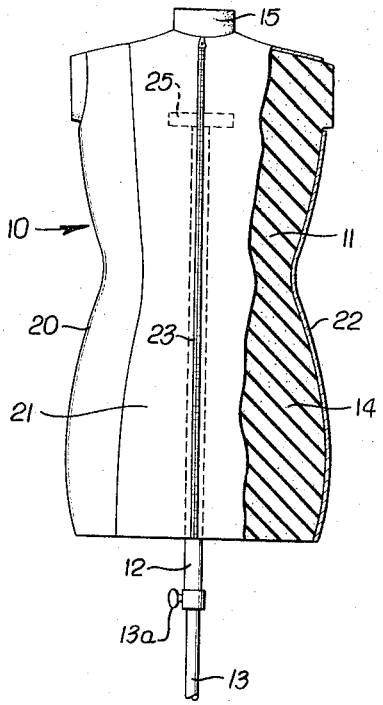
FIG. 3 is a partially cut away rear elevation of the FIG. 1 form body.
Figure 4:
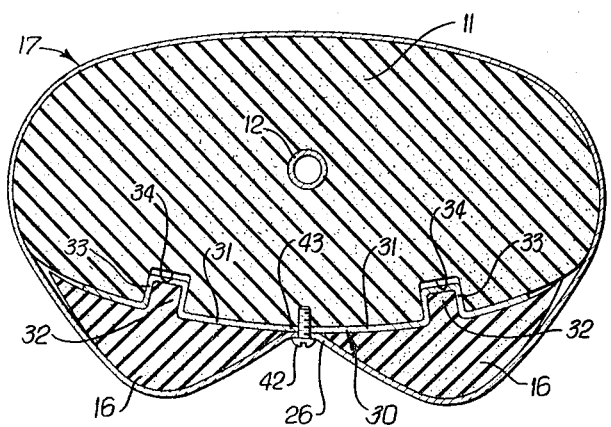
FIG. 4 is an enlarged horizontal section taken on line 4—4 of FIG. 1.

Finally, FIGS. 1 and 2 show the dress form standard tube 12 as supported on a hollow base 66 filled with particulate material such as sand 67 to provide added weight for stability. Further, the base is on casters 68 to provide mobility.

FIG. 20 illustrates the provision of a support member 70 in the form of a simple bar the opposite end portions of which are retained inwardly by the form busts 71, the latter being at least partially integral with the foam body 72. The bar extends transversely, and connects to a fastener 74 acting to hold the jacket 75 inwardly in fitting relation between the busts.

I claim:
1. In a dress form, a resiliently compressible plastic body having the form of an upright human female torso, the body including compressible busts, a substantially non-stretchable jacket fitting over said body in compressing relation thereto, and support means to retain the jacket portion inwardly between said busts while allowing adjustable displacement of the busts relative to the body extent inwardly of the busts, said support means including a relatively rigid support member extending transversely to project interiorly of said busts for inward retention thereby.

2. The combination of claim 1 in which said support means has an intermediate extent at the front of said body, and including a retainer carried by said intermediate extent of the support means to urge the jacket portion between said busts in an inward direction, thereby to better fit said busts.

3. The combination of claim 1 in which said transversely spaced extents of the support means have tongue and groove connections with the busts and the body extent inwardly of the busts.

4. The combination of claim 3 wherein said tongue and groove connections include generally vertically elongated grooves sunk in the main extent of the body and tongues at the inner sides of the busts for vertically adjustable reception in said grooves.

5. The combination of claim 3 in which the busts have inner sides in frictional engagement with the front side of the body extent inwardly of the busts.

6. The combination of claim 2 in which said retainer comprises a screw fastener having a head at the exterior of the jacket.

7. The combination of claim 1 including resiliently compressible plastic padding selectively placed between said body and jacket.

8. The combination of claim 7 in which said padding comprises a generally conical wrapper fitted about a bust.

9. The combination of claim 7 in which said padding comprises a flat sheet compressed between the jacket and body posterior.

10. The combination of claim 2 in which said retainer extends generally vertically and has connection to said jacket at a location in transverse alignment with the underbust regions.

11. The combination of claim 2 in which said retainer extends generally vertically and has connection to said jacket at a location in transverse alignment with the upper bust regions.

12. In a dress form, a resiliently compressible plastic body having the form of an upright human female torso, the body including compressible busts, a jacket fitting snugly over said body, a vertical standard supporting said body, a base supporting the standard, and support means including a metallic member retained at the front of said body by said busts and extending transversely interiorly of and between said busts to urge the jacket inwardly between said busts, said means being everywhere spaced from said standard.

References Cited by the Examiner

UNITED STATES PATENTS

| | | | |
|---|---|---|---|
| 1,073,084 | 9/1913 | Bernstein | 223—68 |
| 1,441,926 | 1/1923 | Harris | 223—68 |
| 2,145,921 | 2/1939 | Witt | 223—120 |
| 2,510,333 | 6/1950 | Davis | 223—68 |
| 2,657,843 | 11/1953 | Wiesner | 223—68 |
| 3,075,677 | 1/1963 | Meisenberg | 223—68 |
| 3,134,524 | 5/1964 | Stewart | 223—68 |

FOREIGN PATENTS 496,562  7/1954  Italy.

JORDAN FRANKLIN, *Primary Examiner.*

G. V. LARKIN, *Assistant Examiner.*